United States Patent
Mansour

(10) Patent No.: US 11,219,011 B1
(45) Date of Patent: Jan. 4, 2022

(54) COORDINATED USE OF ENHANCED DOWNLINK CONTROL CHANNELS (EPDCCHS) IN SHARED SPECTRUM

(71) Applicant: Sprint Spectrum L.P., Overland Park, KS (US)

(72) Inventor: Nagi A. Mansour, Arlington, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 113 days.

(21) Appl. No.: 16/822,812

(22) Filed: Mar. 18, 2020

(51) Int. Cl.
*H04W 72/04* (2009.01)
*H04W 72/12* (2009.01)

(52) U.S. Cl.
CPC ......... *H04W 72/042* (2013.01); *H04W 72/12* (2013.01)

(58) Field of Classification Search
CPC ............................. H04W 72/12; H04W 72/042
USPC ............................................................ 370/330
See application file for complete search history.

(56) References Cited

U.S. PATENT DOCUMENTS

| | | | |
|---|---|---|---|
| 8,254,329 B2 | 8/2012 | Ko et al. | |
| 8,837,271 B1 | 9/2014 | Mansour et al. | |
| 9,622,233 B1 | 4/2017 | Mansour et al. | |
| 2005/0037718 A1 | 2/2005 | Kim et al. | |
| 2006/0067421 A1 | 3/2006 | Walton et al. | |
| 2007/0223364 A1 | 9/2007 | Terabe et al. | |
| 2008/0253311 A1 | 10/2008 | Jin | |
| 2009/0207780 A1 | 8/2009 | Kishigami et al. | |
| 2010/0110986 A1 | 5/2010 | Nogami et al. | |
| 2010/0208608 A1 | 8/2010 | Wang | |
| 2010/0246376 A1 | 9/2010 | Nam et al. | |
| 2010/0246455 A1 | 9/2010 | Nangia et al. | |
| 2011/0038344 A1 | 2/2011 | Chmiel et al. | |
| 2011/0081932 A1 | 4/2011 | Astely et al. | |
| 2011/0228735 A1 | 9/2011 | Lee et al. | |
| 2011/0274197 A1 | 11/2011 | Zhu et al. | |
| 2012/0002746 A1 | 1/2012 | Pham | |
| 2012/0113941 A1 | 5/2012 | Chung et al. | |
| 2013/0070580 A1 | 3/2013 | Wang et al. | |
| 2013/0083764 A1 | 4/2013 | Kim et al. | |
| 2013/0128826 A1 | 5/2013 | Lin et al. | |
| 2013/0195034 A1 | 8/2013 | Noh et al. | |
| 2013/0242904 A1 | 9/2013 | Sartori et al. | |
| 2014/0004857 A1 | 1/2014 | Rune et al. | |
| 2014/0071952 A1 | 3/2014 | Kim et al. | |

(Continued)

FOREIGN PATENT DOCUMENTS

WO     WO2011/098955     8/2011

OTHER PUBLICATIONS

U.S. Appl. No. 16/556,529, filed Aug. 30, 2019.

(Continued)

*Primary Examiner* — Angel T Brockman

(57) ABSTRACT

A method for coordinated control-channel signaling by first and second access nodes that provide overlapping coverage on respective first and second carriers that overlap in frequency with each other. The first access node configures a first enhanced physical downlink control channel (ePDCCH) on the first carrier and the second access node configures a second ePDCCH on the second carrier, with the first ePDCCH and second ePDCCH overlapping in frequency and time with each other, for efficient use of PDSCH capacity of the two carriers. In an implementation, the two access nodes could operate according to different radio access technologies. For instance, the first access node could provide LTE service, and the second access node could provide 5G NR service.

20 Claims, 8 Drawing Sheets

(56) References Cited

U.S. PATENT DOCUMENTS

| | | |
|---|---|---|
| 2014/0086184 A1 | 3/2014 | Guan et al. |
| 2014/0247801 A1 | 9/2014 | Oizumi et al. |
| 2014/0301299 A1 | 10/2014 | Wu |
| 2016/0270066 A1 | 9/2016 | Seo et al. |

OTHER PUBLICATIONS

K. Singhal, "Walsh Codes, PN Sequences and their role in CDMA Technology," Term Paper—EEL 201.

Hongyan, "Physical Hybrid-ARQ Indicator Channel (PHICH)," http://lteuniversity.com/get_trained/expert_opinion1/b/hongyanlei/archive/2011/07/08/physical-hybrid-arq-indicator-channel-phich.aspx, Jul. 8, 2011.

Jialing Liu, et al., "Design and Analysis of LTE Physical Downlink Control Channel," IEEE, Spring 2009.

Min Lee and Seong Keun Oh, "On Resource Block Sharing in 3GPP-LTE System," 17th Asia-Pacific Conference on Communications (APCC), IEEE, 2011.

Rana A. Abdelaal, et al., "Resource Allocation Strategies Based on the Signal-to-Leakage-plus-Noise Ration in LTE-A CoMP Systems," Proceedings of IEEE Wireless Communications and Networking Conference (WCNC), 2012.

Uplink Control Channel Formal 1, accessed on May 17, 2012 from www.steepestascent.com/content/mediaassets/html/LTE/help/PUCCH Format 1.html.

Jaimin Patel, "LTE MIMO Concepts," posted to www.4gwirelessjobs.com on Jun. 27, 2010.

COORDINATED USE OF ENHANCED DOWNLINK CONTROL CHANNELS (EPDCCHS) IN SHARED SPECTRUM

BACKGROUND

A cellular wireless network typically includes a number of access nodes that are configured to provide wireless coverage areas, such as cells and cell sectors, in which user equipment devices (UEs) such as cell phones, tablet computers, machine-type-communication devices, tracking devices, embedded wireless modules, and/or other wirelessly equipped communication devices (whether or not user operated), can operate. Each access node could be coupled with a core network that provides connectivity with various application servers and/or transport networks, such as the public switched telephone network (PSTN) and/or the Internet for instance. With this arrangement, a UE within coverage of the cellular network could engage in air interface communication with an access node and could thereby communicate via the access node with various application servers and other entities.

Such a network could operate in accordance with a particular radio access technology (RAT), with communications from the access nodes to UEs defining a downlink or forward link and communications from the UEs to the access nodes defining an uplink or reverse link.

Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which can facilitate mobile broadband service using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each access node could provide coverage on one or more radio frequency (RF) carriers, each of which could be frequency division duplex (FDD), defining separate frequency channels for downlink and uplink communication, or time division duplex (TDD), with a single frequency channel multiplexed over time between downlink and uplink use. Each such frequency channel could be defined as a specific range of frequency having a bandwidth and a center frequency and thus extending from a low-end frequency to a high-end frequency.

Further, on the downlink and uplink, the air interface on each carrier could be configured in a specific manner to define physical resources for carrying information (e.g., user-plane data and control-plane signaling) wirelessly between the access node and UEs.

In a non-limiting example implementation, for instance, the air interface on each carrier could be divided over time into frames, subframes, and symbol time segments, and over frequency into subcarriers that could be modulated to carry data. The example air interface could thus define an array of time-frequency resource elements, with each resource element spanning a respective symbol time segment and occupying a respective subcarrier, and the subcarrier of each resource element could be modulated to carry information.

In addition, certain groups of these resource elements on the downlink and uplink could then be designated for special use.

In a non-limiting example, for instance, on the downlink, the resource elements in the first symbol time segments per subframe could be generally reserved to define a physical downlink control channel (PDCCH) for carrying control signaling such as scheduling directives from the access node to served UEs, and the resource elements in the remaining symbol time segments per subframe could be generally reserved to define a physical downlink shared channel (PDSCH) in which the resource elements could be grouped to define physical resource blocks (PRBs) that could be allocated on an as needed basis to carry data communication from the access node to UEs.

Further, even within these generally reserved regions on the downlink, certain resource elements in some or all subframes could be set aside for other use, such as to carry synchronization signals that UEs could detect as an in indication of coverage, to carry broadcast messages such as system information blocks that carry information about system operation, and to carry a reference signal that UEs could measure as basis to gauge coverage strength.

Likewise, on the uplink, a group of resource elements at the low-frequency end of the carrier and a group of resource elements at the high-frequency end of the carrier could be reserved to define an uplink control channel (PUCCH), and the remaining resource elements between those two ends could be generally reserved to define a physical uplink shared channel (PUSCH) in which the resource elements could be grouped to define PRBs that could be allocated on an as needed basis to carry data communications from UEs to the access node. Further, even within these generally reserved regions of the uplink, certain resource elements in some or all subframes could be set aside for other use, such as to carry uplink reference signals and random-access messaging, among other possibilities.

Overview

Under an example RAT, although the downlink of the air interface on a given carrier may preconfigured to have a PDCCH for carrying control signaling from the access node to UEs, that PDCCH may not have enough resource-element capacity to carry all of the downlink control signaling that the access node may need to transmit to UEs per unit time. Further, this may increasingly be the case as the industry develops new wireless communication technologies that allow an access node to serve more and more UEs on a given carrier.

To help overcome this issue, the industry has also introduced an enhanced physical downlink control channel (ePDCCH), which could be configured on the downlink of a carrier to occupy resource elements that would otherwise be used to define one or more PRBs of the carrier's PDSCH. Optimally, adding this ePDCCH could increase downlink control channel capacity of the carrier, which could help accommodate growing wireless communications.

To configure an ePDCCH on a carrier, an access node could designate and set aside a portion of the PDSCH to function as the ePDCCH, and the access node could notify one or more of its served UE(s) where the ePDCCH is defined. As each such UE is served by the access node, the UE could then monitor the indicted ePDCCH in search of any control messaging that the access node sends for the UE, such as a scheduling directive in which the access node specifies allocation of one or more PRBs for carrying data to the UE.

While an ePDCCH beneficially adds downlink control channel capacity that could help accommodate growing needs for control signaling, a unfortunate downside of the ePDCCH is that it consumes valuable PDSCH capacity that could otherwise be used to carry scheduled data communications from the access node to one or more served UEs.

Furthermore, this issue could be magnified in a dynamic spectrum sharing (DSS) arrangement in which multiple access nodes operate on carriers that overlap in RF spectrum with each other, as DSS could further restrict the availability of each access node's PDSCH resources.

DSS could apply by way of example at a cell site or in another scenario that supports operation according to two RATs (such as 4G LTE and 5G NR), with a first access node providing coverage and service according to a first RAT (first-RAT service) and a second access node providing overlapping coverage and service according to a second RAT (second-RAT service). Given spectrum-licensing costs, an operator of such access nodes might configure the two access nodes to operate respectively on carriers that overlap partly or fully in frequency with each other, such that the PDSCH of one access node's carrier fully or partly occupies the same RF spectrum as the PDSCH of the other access node's carrier.

To facilitate having two access nodes operate on these overlapping carriers with minimized interference, the access nodes could be configured to coordinate their operation so that they do not allocate the same portions of RF spectrum as each other at the same time as each other. For instance, if the first-RAT access node is going to allocate first-RAT PRBs in a given subframe of the first-RAT carrier for carrying data to one or more served UEs, the first-RAT access node could engage in signaling with the second-RAT access node to ensure that, in the same subframe, the second-RAT access node will not allocate any second-RAT PRBs on the second-RAT carrier that would overlap in frequency with allocated first-RAT PRBs. As a result of this arrangement, however, each access node's carrier may have limited PDSCH capacity even without the introduction of an ePDCCH, as each access node would be dynamically sharing the RF spectrum of its PDSCH with the other access node.

If each of the two access nodes in this situation also configures a separate respective ePDCCH on its carrier, that ePDCCH would add to the PDSCH capacity restriction caused by DSS. And the combination of these restrictions could be even more problematic.

The present disclosure provides a mechanism to help address this problem. In accordance with the disclosure, the two access nodes that operate on frequency-overlapping carriers will configure respective ePDCCHs that overlap with each other in both frequency and time, so that there will be at least some time at which the ePDCCH on one access node's carrier overlaps in frequency with the ePDCCH on the other access node's carrier, to define an overlapping ePDCCH frequency range.

In an example implementation, for instance, where the PDSCH of the first-RAT carrier overlaps with the PDSCH of the second-RAT carrier to define an overlapping PDSCH frequency range, the two access nodes could configure respective ePDCCHs that occupy the same portion of the overlapping PDSCH frequency range as each other, in the same subframes as each other. Alternatively, the access nodes could configure their respective ePDCCHs in another manner, provided that there is at least some time when the ePDCCHs overlap in frequency with each other.

This configuration of overlapping ePDCCHs on the carriers could help minimize the aggregate extent to which the RF spectrum of the access nodes' carriers is consumed for ePDCCH use and could thereby maximize the aggregate extent to which PDSCH capacity of the access nodes' carriers could be available for use to carry data from the access nodes to served UEs.

Unfortunately, however, another technical problem that can arise here is that transmission of control signaling by one access node on its respective ePDCCH could interfere with physically overlapping transmission of control signaling by the other access node on its respective ePDCCH, which could prevent one or more UEs from successfully receiving downlink control signaling from the access nodes.

The present disclosure provides a mechanism to help overcome this problem as well. In accordance with the disclosure, in a scenario where two access nodes with physically overlapping coverage configure respective ePDCCHs that overlap with each other in time and frequency as noted above, the access nodes will further orthogonally encode their ePDCCH control-signaling transmissions so as to differentiate their respective control-signaling transmissions from each other.

For instance, if the first-RAT access node configures on the first-RAT carrier a first-RAT ePDCCH and the second-RAT access node configures on the second-RAT carrier a second-RAT ePDCCH that overlaps in time and frequency with the first-RAT ePDCCH, then first-RAT access node could encode its control signaling on the first-RAT ePDCCH with a first code, and the second-RAT access node could encode its control signaling on the second-RAT ePDCCH with a second code orthogonal with the first code. Without limitation, the first and second codes could be different respective Walsh codes.

With this arrangement, each of one or more UEs served by the first-RAT access node on the first-RAT carrier and looking for control signaling on the first-RAT ePDCCH could apply the first orthogonal code to extract information from resource elements of the first-RAT ePDCCH, which the UE could then evaluate to determine whether the information represents control signaling for the UE. And each of one or more UEs served by the second-RAT access node on the second-RAT carrier and looking for control signaling on the second-RAT ePDCCH could apply the second orthogonal code to extract information from resource elements of the second-RAT ePDCCH, which the UE could then evaluate to determine whether the information represents control signaling for the UE.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

An example implementation will now be described in the context of a system that includes collocated 4G and 5G access nodes respectively supporting 4G LTE service and 5G NR service, where the 4G and 5G access nodes provide physically overlapping coverage in which the access nodes share spectrum, and the access nodes configure respective overlapping ePDCCHs as discussed above.

However, it should be understood that the disclosed principles could extend to apply in other scenarios as well, such as where both access nodes operate on the same RAT as each other or use other RATs and/or other network configurations, among other possibilities. Further, it should be understood that other changes from the specific arrangements and processes described are possible. For instance, various described entities, connections, functions, and other elements could be added, omitted, distributed, re-located, re-ordered, combined, or changed in other ways. In addition, operations described as being performed by one or more entities could be implemented in various ways, such as by a processing unit executing instructions stored in non-transitory data storage, along with associated circuitry or other hardware, among other possibilities.

Figure 1:
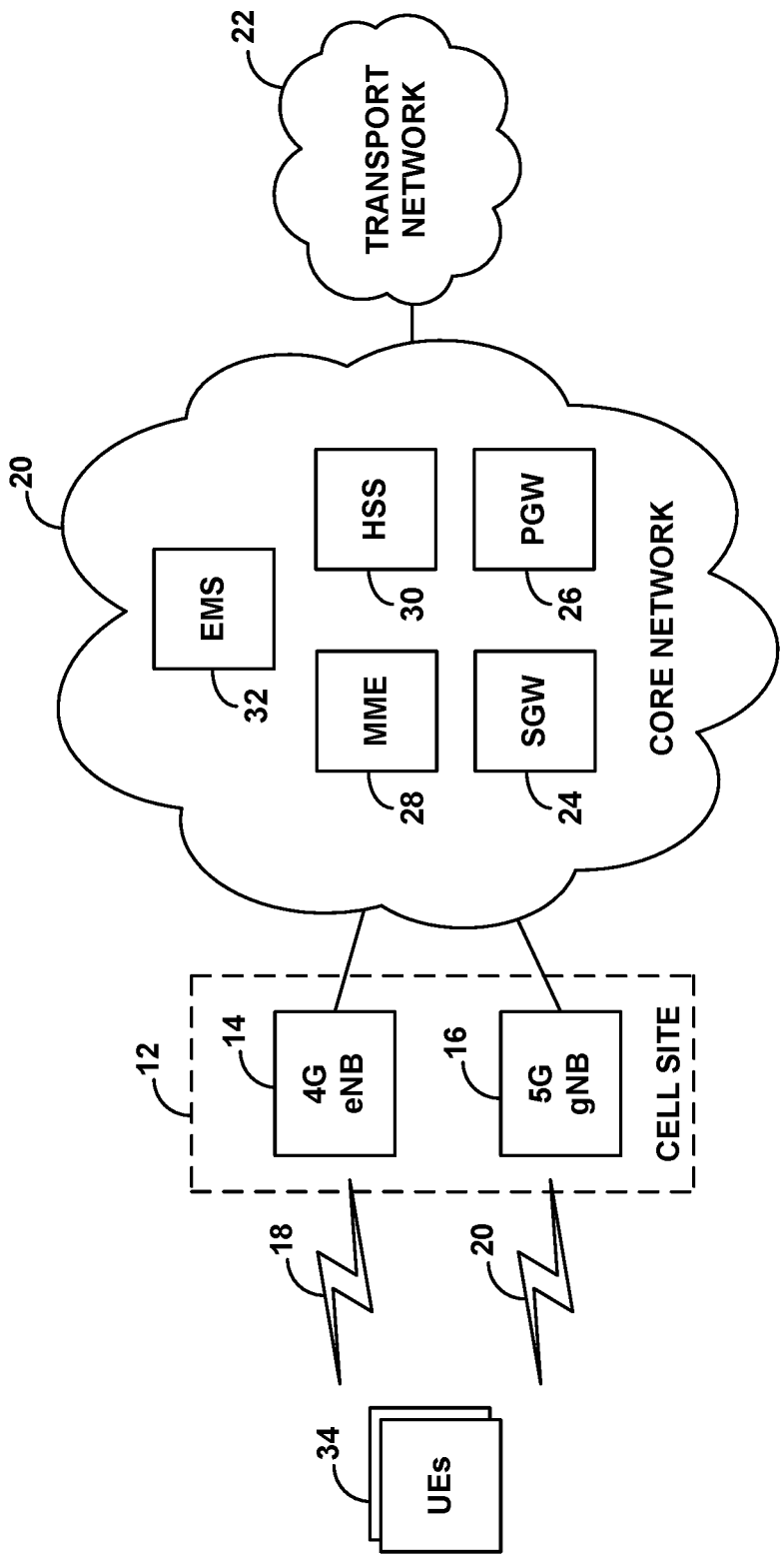
FIG. 1 is a simplified block diagram of an example network arrangement in which aspects of the present disclosure can be implemented.

FIG. 1 is a simplified block diagram of an example network arrangement having a cell site 12 that includes a 4G eNB 14 and a 5G gNB 16. These access nodes could be macro access nodes of the type configured to provide a wide range of coverage or could take other forms, such as small cell access nodes, repeaters, femtocell access nodes, or the like, possibly configured to provide a smaller range of coverage. Further, the access nodes could have respective antenna structures, which could be collocated with each other and configured to provide coverage of the same or similar direction and scope as each other.

Each access node could be configured to provide coverage and service on at least one carrier according to its respective RAT. In particular, the 4G eNB 14 could be configured to provide coverage and service on at least one carrier functioning as a 4G carrier 18, and the 5G eNB 16 could be configured to provide 5G coverage and service on at least one carrier functioning as a 5G carrier 20. Each of these carriers 18, 20 could be FDD or TDD as discussed above.

In an example implementation, the air interface on each such carrier could be configured to define various air-interface resources for carrying communications between the access node and UEs.

By way of example, in the time domain, the air interface could define a continuum of 10-millisecond (ms) frames, each divided into ten 1-ms subframes, and each subframe could be further divided into a number of timeslots, each additionally divided into symbol time segments. And in the frequency domain, the bandwidth of each carrier on which the access node operates could be divided into subcarriers with specified subcarrier spacing on the order of 15 to 240 kHz. With this example arrangement, the air interface on each carrier would define the array of resource elements as noted above, with each resource element each spanning a respective symbol time segment and occupying a respective subcarrier, and the access node and UEs could communicate with each other through modulation of the subcarriers to carry information in those resource elements.

Further, as discussed above, groups of these resource elements could be designated for special use.

For instance, in each downlink subframe, the resource elements in the first few symbol time segments could be generally reserved to define a PDCCH, and the resource elements in the remaining symbol time segments could be generally reserved to define a PDSCH with resource elements grouped across the carrier bandwidth to define the downlink PRBs noted above. Further, certain groups of resource elements in downlink subframes could be reserved for other purposes, such as to carry synchronization signals, reference signals, and broadcast information messages, among other possibilities. And in each uplink subframe, resource elements across the carrier bandwidth to define the uplink PRBs noted above, and PRBs at the low-frequency end and high-frequency end of the carrier could be generally reserved to define a PUCCH, while the remaining PRBs could be generally reserved to define a PUSCH.

Note also that the 4G air interface and 4G service provided by 4G eNB 14 on the 4G carrier 18 could differ from the 5G air interface and 5G service provided by the 5G gNB 16 on the 5G carrier 20 in various ways now known or later developed. For example, the carriers may have different subcarrier spacing than each other and/or different symbol time segments than each other and may therefore have different PRB configurations than each other. As another example, one carrier may provide variable subcarrier spacing and the other may provide fixed subcarrier spacing. As yet another example, the carriers may make use of different MIMO technologies than the other. And as still another example, with TDD carriers, one carrier may have a flexible TDD configuration and the other may have a fixed TDD configuration. Other examples are possible as well.

In the example of FIG. 1, the 4G eNB and 5G gNB are each shown interconnected with a core network 20 that provides connectivity with a transport network 22. The core network 20 could be a packet-switched network configured as an Evolved Packet Core (EPC) network or a Next Generation Core (NGC) core network, among other possibilities, with entities having Internet Protocol (IP) addresses and being configured to communicate with each other through virtual packet-tunnels or the like.

In an example EPC arrangement, as shown, the core network includes a serving gateway (SGW) 24 and a packet-data-network gateway (PGW) 26, for carrying user-plane communications through the core network between an access node and the transport network. Further, the core network includes a mobility management entity (MME) 28, which functions as a core-network controller, responsible for managing UE attachment and bearer setup, among other operations, and a home subscriber server (HSS) 30, which stores UE profile records and may specify service-subscription plans, UE configurations, and/or other such UE capability information.

The example core network is also shown including an element management system (EMS) 32, which could operate as a central repository of operational data for the wireless communication network and to control and manage operation of various network elements, to help ensure optimal use of their resources. In practice, entities such as the access nodes could regularly report to the EMS various operational data, such as data regarding connectivity and service of UEs, and data regarding access node load (e.g., PRB utilization) and performance, among others. And the EMS could oversee operation of the access nodes and other entities, providing operation directives or the like to which the entities could be configured to respond accordingly.

The network of FIG. 1 could be implemented by a given mobile network operator (MNO), to which UEs may subscribe to receive wireless communication service. Further, the network could provide service on behalf of another MNO, such as a mobile virtual network operator (MVNO), to which other UEs may subscribe to receive wireless communication service, among other possibilities.

FIG. 1 also depicts multiple UEs 34 that could be within coverage of cell site 12.

When each such UE enters into coverage of the cell site 12, the UE could detect threshold strong coverage of a given access node, such as 4G eNB 14 or 5G gNB 16, on a particular carrier, perhaps by discovering a synchronization signal broadcast on the carrier and then determining that that reference-signal strength on the carrier is threshold strong. In turn, UE could then engage in random-access and connection signaling, such as Radio Resource Control (RRC) signaling, with the access node to establish an RRC connection or the like through which the access node will then serve the UE on the carrier.

Further, if the UE is not already registered for service with the core network 20, the UE could transmit to the access node an attach request, which the access node could forward to the MME 28 for processing. And after authentication of the UE, the MME could then coordinate setup for the UE of one or more user-plane bearers for carrying user-plane communications between the UE and the PGW 26.

Once the UE is so connected and registered with the example network, the access node could then serve the UE in an RRC-connected mode on the carrier, managing downlink air-interface communication of packet data to the UE and uplink air-interface communication of packet data from the UE.

For example, with the air interface described above, when packet data for the UE arrives at the core network from a transport network, the data could flow to the UE's serving access node, and the access node could then schedule and provide transmission of that data to the UE on particular downlink PRBs of the carrier. Likewise, when the UE has data to transmit on the transport network, the UE could transmit a scheduling request to the access node, the access node could responsively schedule transmission of that data from the UE on particular uplink PRBs of the carrier, and the UE could accordingly transmit the data to the access node for forwarding through the core network to the transport network.

To schedule such downlink or uplink communications, the access node could transmit to the UE a "downlink control information" (DCI) signaling message that is masked with an identifier of the UE and that specifies information such as which PRBs are being used, or will be used, for the communication. In particular, with the downlink defined as described above, the access node could transmit this DCI to the UE in groups of resource elements of the PDCCH of the carrier. The UE could then engage in a blind decoding process to find a group of resource elements that is masked with the UE's identifier, thus establishing that the group of resource elements carries control signaling to the UE.

In addition, as discussed above, the access node could define an ePDCCH on its carrier and could arrange with a UE for use of that ePDCCH as an alternative or in addition to use of the PDCCH.

Figure 2:
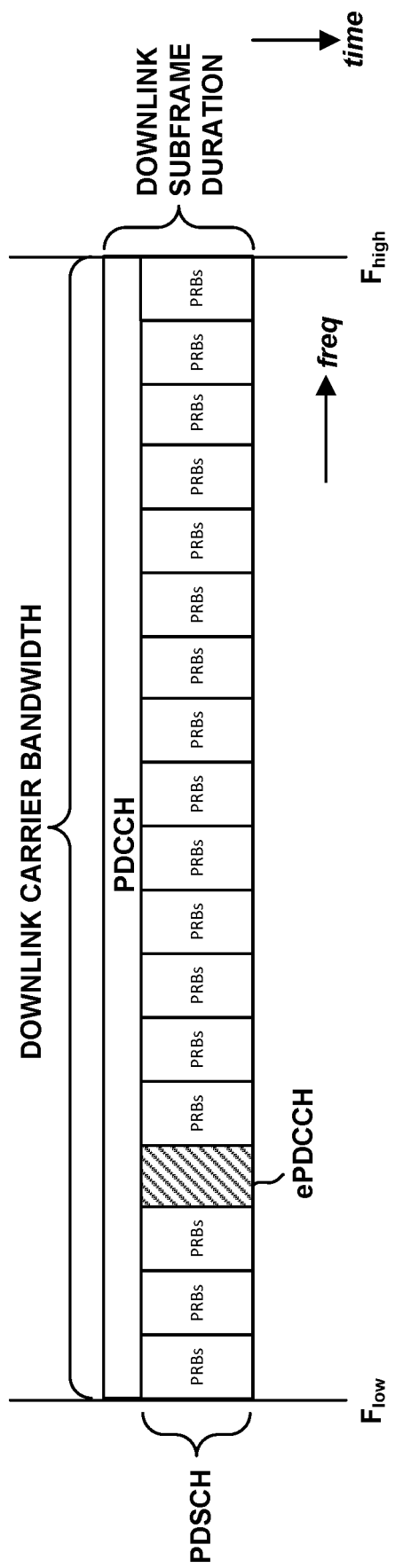
FIG. 2 is a simplified illustration of an example downlink subframe of an example carrier.

FIG. 2 illustrates an example of such a configuration in a representative downlink subframe of a carrier. Namely, FIG. 2 depicts the subframe as having a downlink subframe duration and spanning a downlink carrier bandwidth that ranges from a low-end frequency position $F_{low}$ to a high-end frequency position $F_{high}$, with a first time portion of the subframe generally defining a PDCCH and a remaining time portion of the subframe generally defining a PDSCH divided into downlink PRBs. Further, the figure depicts an example ePDCCH region configured to occupy a part of the PDSCH in place of one or more PRBs.

An access node could configure the ePDCCH on this carrier for use to carry control signaling to one or more UEs connected with the access node. To do so, for instance, the access node could transmit to each such UE an RRC connection reconfiguration control message that includes an "EPDCCH-Config" information element specifying which downlink subframes (e.g., per frame) will include the ePDCCH, which PRB(s) the ePDCCH will occupy, and what the starting symbol of the ePDCCH is, which could default to be the first symbol after the PDCCH. Upon receipt of this signaling message from the access node, a UE could then treat the ePDCCH as a control region that can carry control signaling such as DCI messaging to the UE, for purposes such as scheduling downlink and/or uplink communications.

With this arrangement, each access node could serve potentially multiple UEs at once. To facilitate this, given the limited number of PRBs defined on the access node's carrier, the access node could apply a scheduling algorithm to fairly allocate PRBs among the UEs. Further, the access node might apply other advanced wireless communication techniques, such as multi-user MIMO or the like that enable the access node to serve multiple UEs on limited RF resources.

Note also that cell site 12 might support dual-connectivity, such as EUTRA-NR Dual Connectivity (EN-DC) or the like, where each of various UEs could be served concurrently by both the 4G eNB 14 and the 5G gNB 16. In a representative implementation of EN-DC, for instance, a UE might initially connect with the 4G eNB that would function as a master access node (master Node-B (MeNB)) for dual-connectivity service. And the 4G eNB might then coordinate setup for the UE of a secondary connection between the UE and the 5G gNB, possibly with a split-bearer configuration. With these two connections thus set up, the 4G eNB and 5G gNB could then concurrently serve the UE with packet-data communications, which may help to provide the UE with increased peak data rate and may also help to facilitate network transitions form one RAT to another, among other possible benefits.

As noted above the present disclosure addresses a situation where at least two access nodes provide physically overlapping coverage on respective carriers that overlap partly or fully with each other in frequency and time. For instance, the disclosure could address a situation where the 4G carrier 18 on which 4G eNB 14 operates overlaps partly or fully with the 5G carrier 20 on which the 5G eNB 16 operates. In that situation, the disclosure addresses configuration and use of at least one ePDCCH respectively on each carrier.

Figure 3:
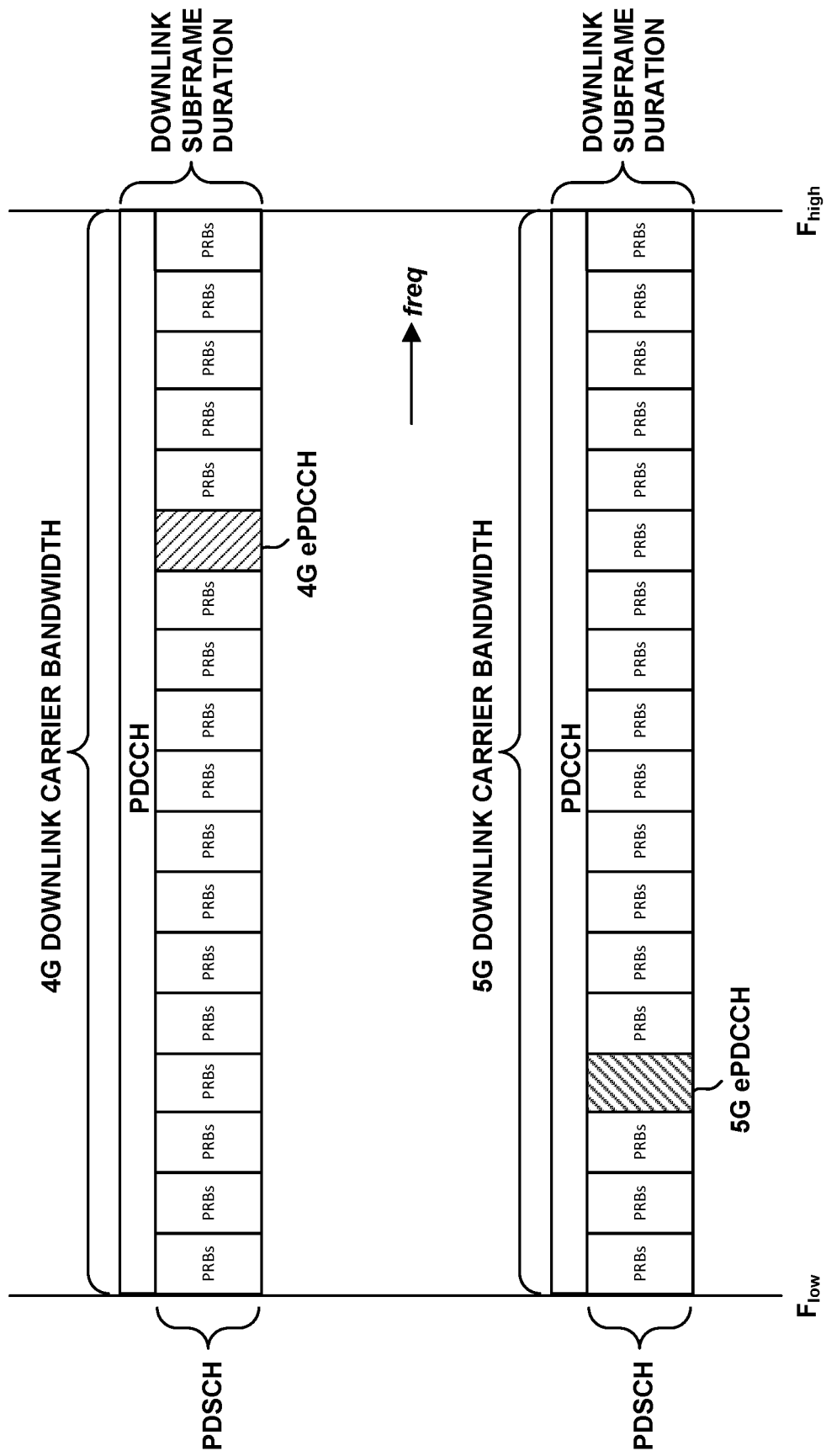
FIG. 3 is a simplified illustration of first and second carriers that overlap with each other to define an overlapping frequency range, where each carrier has a respective ePDCCH.

FIG. 3 illustrates an example scenario where the downlink channels of the 4G carrier 18 and 5G carrier 20 occupy the same spectrum as each other, namely, both extending from frequency $F_{low}$ to frequency $F_{high}$, and where both carriers have PRBs configured in the same manner as each other. Other examples, where the downlink portions of the carriers overlap just partially and/or where the carriers have different PRB configurations, could apply as well.

In the example scenario shown in FIG. 3, the 4G carrier 18 is configured to include a 4G ePDCCH, and the 5G carrier 20 is configured to include a 5G ePDCCH. But these respective ePDCCHs are configured at different parts of the carriers' shared downlink frequency range.

Figure 4:
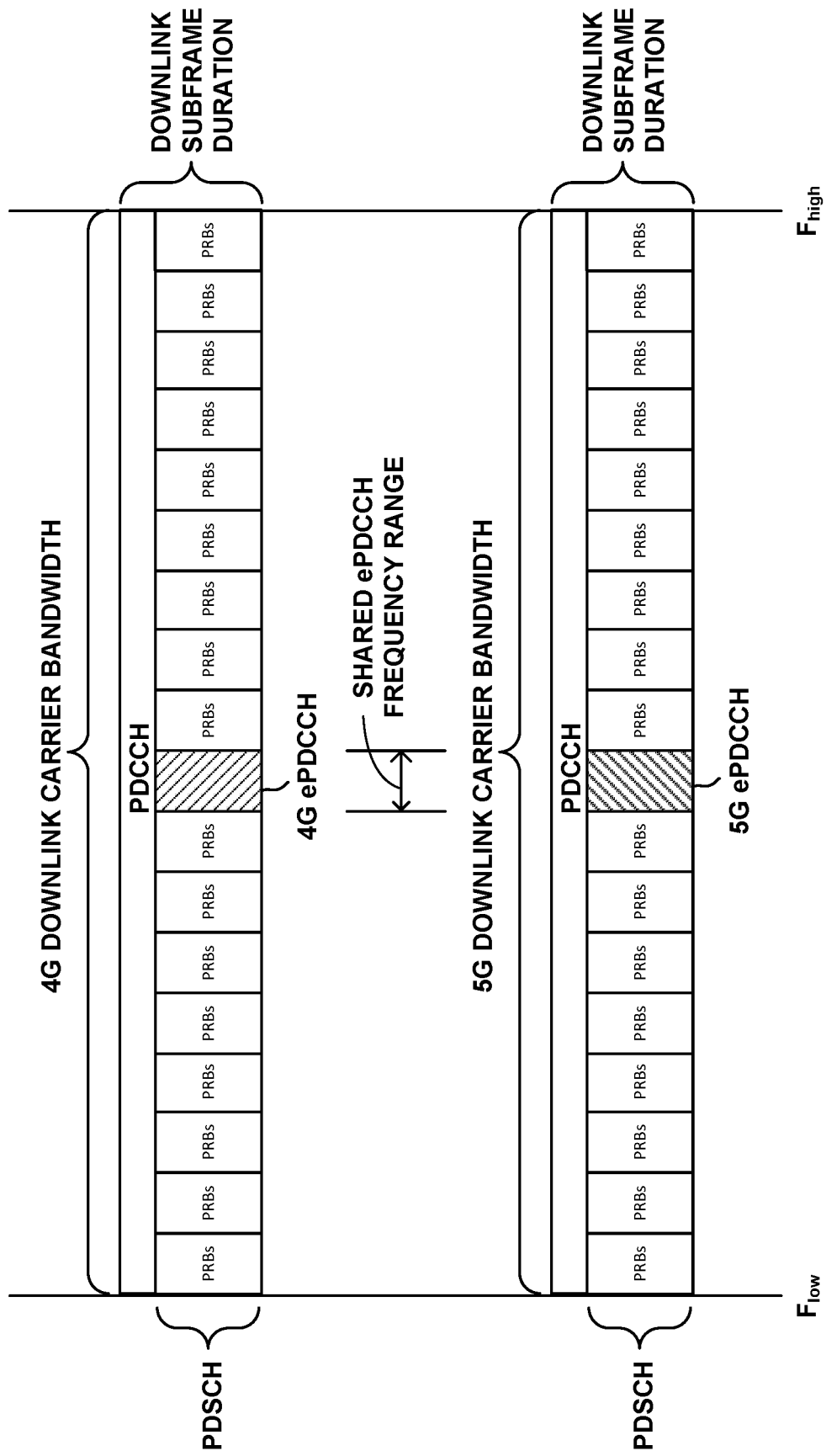
FIG. 4 is a modification of the arrangement of FIG. 3, showing the respective ePDCCHs of the carriers being configured so that they overlap in frequency and time with each other.

FIG. 4 next illustrates an example improvement in accordance with the present disclosure. As shown in FIG. 4, by comparison with the arrangement of FIG. 3, the carriers' respective ePDCCHs are configured to overlap in frequency and time with each other. In particular, in this example, both the 4G ePDCCH and the 5G ePDCCH are configured to occupy the same ePDCCH frequency range as each other. Though in an alternative implementation, the 4G ePDCCH and 5G ePDCCH could instead be configured to occupy respective ePDCCH frequency ranges that overlap just partially in frequency with each other at a given time. And in another alternative implementation, the 4G ePDCCH and 5G ePDCCH could instead be configured to overlap just partially with each other in time on the same frequency as each other.

As noted above, to facilitate having the access nodes operate on overlapping ePDCCHs like this considering that the access nodes' coverage physically overlaps, the access nodes could be configured to orthogonally encode their respective concurrent control channel transmissions on the shared ePDCCH frequency range. For instance, the 4G eNB 14 could be configured to encode its control channel transmissions on the 4G ePDCCH with a first code C1, and the 5G gNB 16 could be configured to encode its control channel transmissions on the 5G ePDCCH with a second code C2 that orthogonal to the first code C1.

In practice, the access nodes could interwork with each other programmatically to arrange for their configuration of overlapping ePDCCHs. For instance, one of the access nodes could first configure, or decide to configure, an ePDCCH at a particular frequency and time position on its own carrier, and that access node could then signal to the other access node to inform the other access node of the plan. And the other access node could then responsively also configure an ePDCCH at the same or partly overlapping frequency and time position on its own carrier as well. Alternatively or additionally, the EMS 32 or another entity could coordinate this configuration by the access nodes. And still alternatively or additionally, these ePDCCH configurations could be preset by engineering design or the like.

Each access node could further configure its respective ePDCCH in the manner noted above, including signaling to one or more served UEs to specify the ePDCCH configuration. And to enable use of the orthogonal coding as noted above, each access node could include in its ePDCCH-configuration signaling to it served UEs or otherwise convey to its served UEs an indication of the orthogonal code that the access node will be using for its control-signaling transmissions on its ePDCCH. That way, the UEs that will be looking for control signaling on the ePDCCH can apply the appropriate orthogonal code to decode and extract control signal transmissions of that ePDCCH from the shared ePDCCH frequency range.

The orthogonal codes that the access nodes use to orthogonally encode their respective ePDCCH transmissions and that UEs would thus use to decode the ePDCCH transmissions could be any type of mutually orthogonal codes. Walsh codes are one class of such orthogonal codes. In general, a set of n orthogonal codes could be any set of n mutually orthogonal vectors in an n-dimensional space. The n orthogonal codes could thus facilitate up to n concurrent ePDCCH transmissions on the same set of resource elements.

The mutual orthogonality of the codes can be expressed in terms of the dot products between any two codes $C_i$ and $C_j$. Specifically, mutual orthogonality means the following:

$$C_i \cdot C_j = 0, \text{ if } i \neq j; \text{ and} \quad (1)$$

$C_i \cdot C_j = k$, if i=j (where k is a non-zero constant).

As a result of this mutual orthogonality, data of the two access nodes' respective ePDCCH signals on the same frequency at the same time can be expressed as a linear combination, L, as follows:

$$L = D_1 C_1 + D_2 C_2 \quad (2)$$

where $D_1$ is the data of the first access node's ePDCCH signal, $D_2$ is the data of the second access node's ePDCCH signal, $C_1$ is the orthogonal code used by the first access node to encode data $D_1$, and $C_2$ is the orthogonal code used by the second access node to encode data $D_2$.

The data of each access node's respective ePDCCH signal can then be recovered from this linear combination by using the respective orthogonal code, as follows:

$$D_1 = (C_1 \cdot L)/k$$

$$D_2 = (C_2 \cdot L)/k \quad (3)$$

Thus, when orthogonal codes are used to encode the multiple ePDCCH transmissions that occur on the same frequency at the same time as each other, the orthogonal code of each respective ePDCCH transmission can be used to recover the ePDCCH transmission from the combination. This approach can thus be used to encode and decode digital data representing the respective ePDCCH transmissions from the 4G eNB 14 and the 5G gNB 16 when conducted on the same frequency at the same time as each other.

In an OFDM communication system, the orthogonal encoding of ePDCCH control signaling codes could occur outside of the OFDM transmitter and the decoding of the ePDCCH control signaling could occur outside of the OFDM receiver. Thus ePDCCH signaling could be orthogonally encoded and then provided to an OFDM transmitter in encoded form for transmission. Similarly, the orthogonally encoded ePDCCH signaling output from an OFDM receiver could be decoded using the corresponding orthogonal code.

Figure 5:
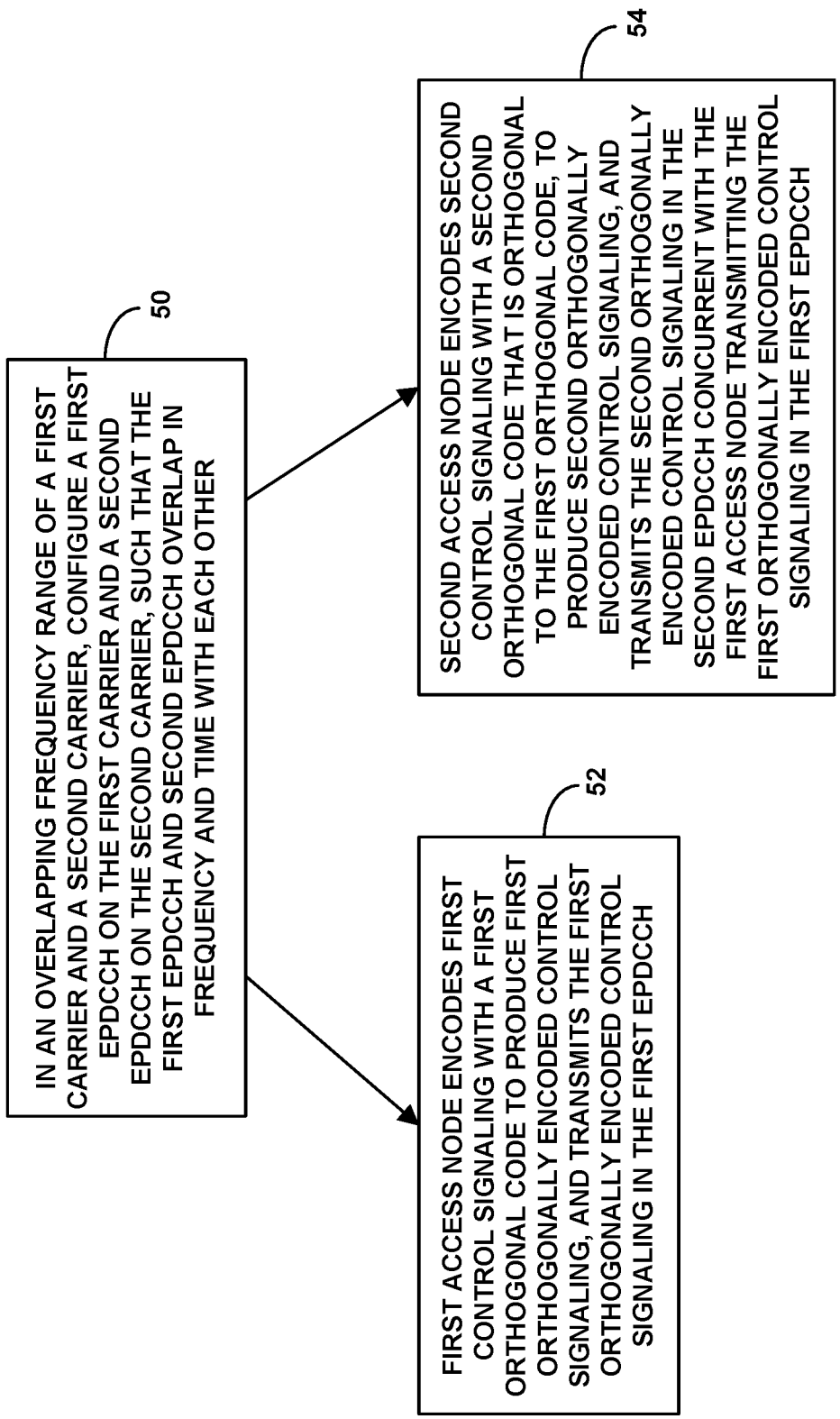
FIG. 5 is a flow chart depicting an example method in accordance with the disclosure.

FIG. 5 is next a flow chart depicting a method that could be carried out in accordance with the present disclosure, for coordinated control-channel signaling by multiple access nodes including a first access node that provides first coverage on a first carrier having a first frequency range and a second access node that provides second coverage on a second carrier having a second frequency range. As discussed above, this method could apply in a scenario where the first coverage overlaps spatially with the second coverage, and where the first frequency range of the first carrier overlaps with the second frequency range of the second carrier to define an overlapping frequency range.

As shown in FIG. 5, at block 50, the method includes configuring in the overlapping frequency range a first ePDCCH on the first carrier and a second ePDCCH on the second carrier, such that the first ePDCCH and second ePDCCH overlap in frequency and time with each other. Further, at block 52, the method includes the first access node encoding first control signaling with a first orthogonal code (e.g., first Walsh code) to produce first orthogonally encoded control signaling, and transmitting the first orthogonally encoded control signaling in the first ePDCCH. And at block 54, the method includes the second access node encoding second control signaling with a second orthogonal code (e.g., second Walsh code) that is orthogonal to the first orthogonal code, to produce second orthogonally encoded control signaling, and transmitting the second orthogonally encoded control signaling in the second ePDCCH concurrent with the transmitting of the first orthogonally encoded control signaling in the first ePDCCH.

In line with the discussion above, the act of configuring in the overlapping frequency range the first ePDCCH on the first carrier and the second ePDCCH on the second carrier could involve the first access node configuring the first ePDCCH in the overlapping frequency range on the first carrier (e.g., as a control region within a PDSCH of the first carrier) and the second access node configuring the second ePDCCH in the overlapping frequency range on the second carrier (e.g. as a control region within a PDSCH of the second carrier).

For instance, this could include the first access node transmitting to at least one UE served by the first access node on the first carrier an ePDCCH-configuration message that specifies configuration of the first ePDCCH on the first carrier, and the second access node transmitting to at least one UE served by the second access node on the second carrier an ePDCCH-configuration message that specifies configuration of the second ePDCCH on the second carrier.

As further discussed above, the method could additionally include the first access node and second access node interworking with each other to arrange for the first ePDCCH and second ePDCCH to overlap in frequency and time with each other.

Still further, as discussed above, the first ePDCCH and second ePDCCH could be coterminous in frequency and time, i.e., fully overlapping. Or the first ePDCCH and the second ePDCCH could partially overlap with each other in frequency and time, so that there would be at least some time when they both occupy the same frequency. The act of transmitting the second orthogonally encoded control signaling could then occur on at least some frequency on which the transmitting of the first orthogonally encoded control signaling also occurs.

Yet further, as discussed above, the first control signaling could include a scheduling directive from the first access node to a UE served by the first access node, and the second signaling could include a scheduling directive from the second access node to a UE served by the second access node.

And still further, as discussed above, the first access node could provide the first coverage on the first carrier according to a first RAT (e.g., 4G LTE), and the second access node could provide the second coverage on the second carrier according to a second RAT (e.g., 5G NR).

Figure 6:
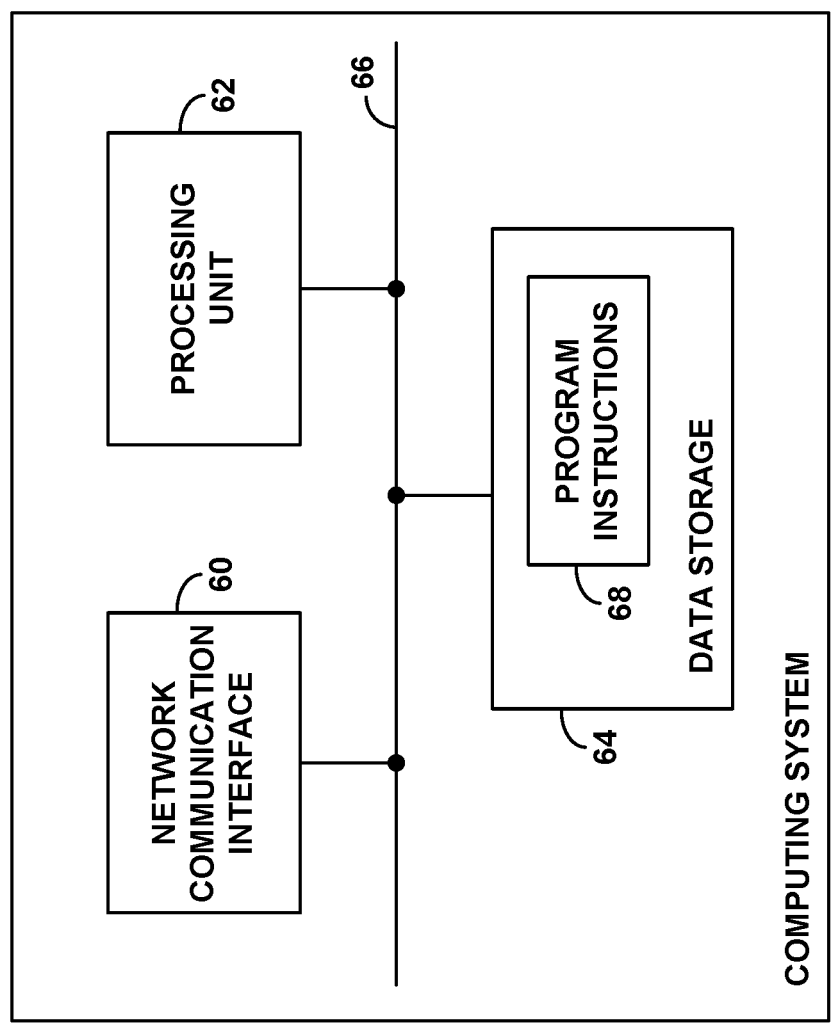
FIG. 6 is a simplified block diagram of an example computing system operable in accordance with the disclosure.

FIG. 6 is next a simplified block diagram of an example computing system that could be configured to cause first and second access nodes to operate as described herein. This computing system could be provided at either or both of the access nodes and/or at an EMS among other possibilities.

As shown in FIG. 6, the example computing system includes a network communication interface 60, at least one processing unit 62, and at least one non-transitory data storage 64, all of which could be integrated together and/or interconnected by a system bus, network, and/or other connection mechanism 66.

The network communication interface 60 could include a physical network connector and associated communication logic to facilitate network communication with various other entities. The at least one processing unit 62 could comprise one or more general purpose processors (e.g., microprocessors) and/or one or more special-purpose processors (e.g., application specific integrated circuits). And the at least one non-transitory data storage 64 could comprise one or more volatile and/or non-volatile storage components (e.g., magnetic, optical, or flash storage). As shown, the data storage 64 could then store program instructions 68, which could be executable by the at least one processing unit 62 to carry out various operations described herein.

Figure 7:
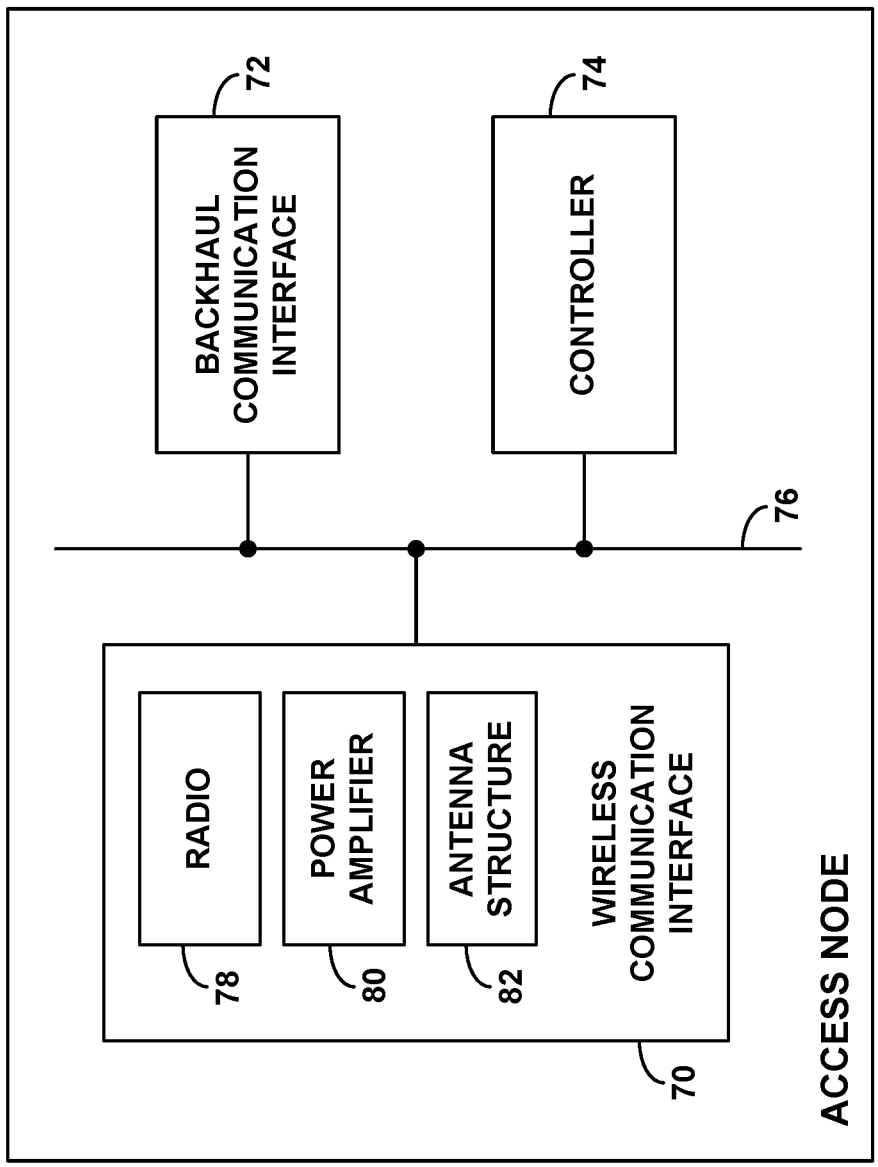
FIG. 7 is a simplified block diagram of an example access node operable in accordance with the disclosure.

FIG. 7 is next a simplified block diagram of an example access node that could operate in accordance with the present disclosure, as 4G eNB 14 or 5G gNB 16 for instance.

As shown in FIG. 7, the example access node includes a wireless communication interface 70, a backhaul communication interface 72, and a controller 74, which could be integrated together and/or communicatively linked by a network, system bus, or other connection mechanism 76.

Wireless communication interface 70 includes a radio 78, a power amplifier 80, and antenna structure 82. The radio 78 could operate to interface between encoded baseband signals and radio frequency signals. The power amplifier 80 could operate to amplify signals for transmission by the antenna structure 82. And the antenna structure 82 could comprise a plurality of antennas for communicating over the air interface, optimally as an array such as a massive-MIMO array for instance, to facilitate beamforming and other operations.

Backhaul communication interface 72 could be a network communication interface (e.g., an Ethernet network interface port and/or connection) through which the access node can communicate with various other network entities.

And controller 74, which could comprise at least one processing unit, at least one non-transitory data storage, and program instructions stored in the data storage and executable by the processing unit, or could take other forms, could be operable to cause the access node to carry out various operations as described herein.

Figure 8:
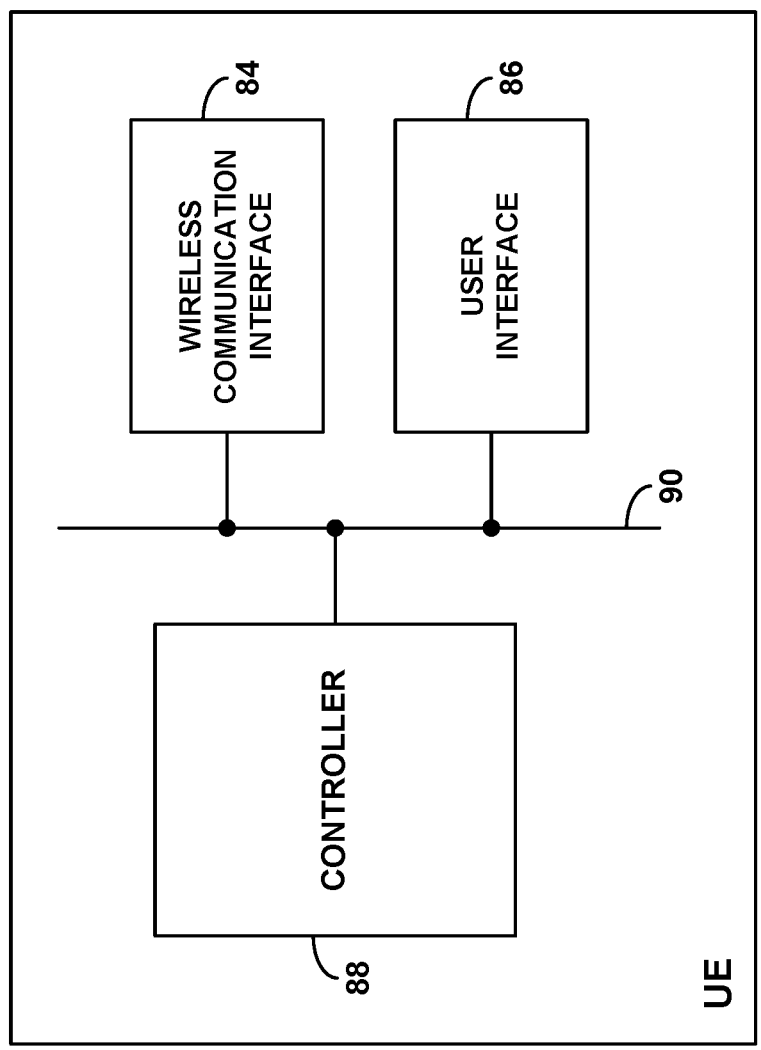
FIG. 8 is a simplified block diagram of an example UE operable in accordance with the disclosure.

Finally, FIG. 8 is a simplified block diagram of an example UE that could be configured to operate in accordance with the present disclosure. As shown in FIG. 8, the example UE could include at least one wireless communication interface 84, at least one user interface 86, and at least one controller 88. These components could be interconnected, integrated in whole or in part, and/or could be communicatively linked together in various ways now known or later developed, such as by a system but or other connection mechanism 90 for instance.

Wireless communication interface 84 could include various components (not shown) such as a radio, power amplifiers, filters, and an antenna structure through which the UE could engage in wireless communication with an access node, BTS, or the like. User interface 86, which could be included if the UE is user operated, could include input and output components (not shown) to facilitate interaction with a user. And controller 88, which could likewise comprise components (not shown) such as a processing unit, non-transitory data storage, and program instructions stored in the data storage and executable the processing unit, could operate to carry out (e.g., cause the UE to carry out) various operations described herein.

Various features described above can be implemented in this context as well, and vice versa.

Further, the present disclosure contemplates a computer-readable medium encoded with, storing, or otherwise embodying program instructions executable by a processing unit to carry out various operations described herein.

Exemplary embodiments have been described above. Those skilled in the art will understand, however, that changes and modifications may be made to these embodiments without departing from the true scope and spirit of the invention.

I claim:

1. A method for coordinated control-channel signaling by a plurality of access nodes including a first access node that provides first coverage on a first carrier having a first frequency range and a second access node that provides second coverage on a second carrier having a second frequency range, wherein the first coverage overlaps spatially with the second coverage, and wherein the first frequency range of the first carrier overlaps with the second frequency range of the second carrier to define an overlapping frequency range, the method comprising:

configuring in the overlapping frequency range (i) a first enhanced physical downlink control channel (ePDCCH) on the first carrier and (ii) a second ePDCCH on the second carrier, wherein the first ePDCCH and second ePDCCH overlap in frequency and time with each other, encoding by the first access node first control signaling with a first orthogonal code to produce first orthogonally encoded control signaling, and transmitting the first orthogonally encoded control signaling in the first ePDCCH; and encoding by the second access node second control signaling with a second orthogonal code that is orthogonal to the first orthogonal code to produce second orthogonally encoded control signaling, and transmitting the second orthogonally encoded control signaling in the second ePDCCH concurrent with the transmitting of the first orthogonally encoded control signaling in the first ePDCCH.

2. The method of claim 1, wherein configuring in the overlapping frequency range the first ePDCCH on the first carrier and the second ePDCCH on the second carrier comprises:

the first access node configuring the first ePDCCH in the overlapping frequency range on the first carrier; and the second access node configuring the second ePDCCH in the overlapping frequency range on the second carrier.

3. The method of claim 2, wherein the first access node configuring the first ePDCCH in the overlapping frequency range on the first carrier comprises transmitting from the first access node to at least one user equipment device (UE) served by the first access node on the first carrier an ePDCCH-configuration message that specifies configuration of the first ePDCCH on the first carrier; and wherein the second access node configuring the second ePDCCH in the overlapping frequency range on the second carrier comprises transmitting from the second access node to at least one UE served by the second access node on the second carrier an ePDCCH-configuration message that specifies configuration of the second ePDCCH on the second carrier.

4. The method of claim 1, further comprising the first access node and second access node interworking with each other to arrange for the first ePDCCH and second ePDCCH to overlap in frequency and time with each other.

5. The method of claim 1, wherein configuring the first ePDCCH on the first carrier comprises configuring the first ePDCCH as a control region within a physical downlink shared channel (PDSCH) of the first carrier, and wherein configuring the second ePDCCH on the second carrier comprises configuring the second ePDCCH as a control region within a PDSCH of the second carrier.

6. The method of claim 1, wherein the first ePDCCH and second ePDCCH are coterminous in frequency and time.

7. The method of claim 1, wherein the first ePDCCH and the second ePDCCH partially overlap with each other in frequency and time.

8. The method of claim 1, wherein transmitting the second orthogonally encoded control signaling occurs on at least some frequency on which the transmitting of the first orthogonally encoded control signaling occurs.

9. The method of claim 1, wherein the first control signaling comprises a scheduling directive from the first access node to a user equipment device (UE) served by the first access node, and wherein the second signaling comprises a scheduling directive from the second access node to a UE served by the second access node.

10. The method of claim 1, wherein the first access node provides the first coverage on the first carrier according to a first radio access technology (RAT), and wherein the second access node provides the second coverage on the second carrier according to a second RAT.

11. The method of claim 10, wherein the first RAT is 4G Long Term Evolution (LTE) and wherein the second RAT is 5G New Radio (NR).

12. The method of claim 1, wherein the first and second orthogonal codes are Walsh codes.

13. A wireless communication system comprising:

a first access node configured to provide first wireless coverage on a first carrier having a first frequency range;

a second access node configured to provide second wireless coverage on a second carrier having a second frequency range, wherein the first wireless coverage overlaps spatially with the second wireless coverage, and wherein the first frequency range of the first carrier overlaps with the second frequency range of the second carrier to define an overlapping frequency range, wherein the first access node is arranged to (i) configure on the first carrier, in the overlapping frequency range, a first enhanced physical downlink control channel (ePDCCH), (ii) encode first control signaling with a first orthogonal code to produce first orthogonally encoded control signaling, and (iii) transmit the first orthogonally encoded control signaling in the first ePDCCH, wherein the second access node is arranged to (i) configure on the second carrier, in the overlapping frequency range, a second ePDCCH, (ii) encode second control signaling with a second orthogonal code to produce second orthogonally encoded control signaling, and (iii) transmit the second orthogonally encoded control signaling in the second ePDCCH, and wherein the first ePDCCH and second ePDCCH overlap in frequency and time with each other.

14. The wireless communication system of claim 13, wherein the first and second access nodes are configured to interwork with each other to arrange for the first ePDCCH and second ePDCCH to overlap in frequency and time with each other.

15. The wireless communication system of claim 13, wherein configuring the first ePDCCH on the first carrier comprises configuring the first ePDCCH as a control region within a physical downlink shared channel (PDSCH) of the first carrier, and wherein configuring the second ePDCCH on the second carrier comprises configuring the second ePDCCH as a control region within a PDSCH of the second carrier.

16. The wireless communication system of claim 13, wherein the first ePDCCH and second ePDCCH are coterminous in frequency and time.

17. The wireless communication system of claim 13, wherein the first ePDCCH and the second ePDCCH partially overlap with each other in frequency and time.

18. The wireless communication system of claim 13, wherein the first control signaling comprises a scheduling directive from the first access node to a user equipment device (UE) served by the first access node, and wherein the second signaling comprises a scheduling directive from the second access node to a UE served by the second access node.

19. The wireless communication system of claim 13, wherein the first access node provides the first coverage on the first carrier according to a first radio access technology (RAT), and wherein the second access node provides the second coverage on the second carrier according to a second RAT.

20. The wireless communication system of claim 13, wherein the first RAT is 4G Long Term Evolution (LTE) and wherein the second RAT is 5G New Radio (NR).

* * * * *